(12) United States Patent
Buyuksahin

(10) Patent No.: US 10,642,423 B2
(45) Date of Patent: May 5, 2020

(54) MULTI-FUNCTION SENSING SYSTEM

(71) Applicant: SENSOBRIGHT INDUSTRIES, LLC, Dover City, Kent County, DE (US)

(72) Inventor: Utku Buyuksahin, Kadikoy/Istanbul (TR)

(73) Assignee: SENSOBRIGHT INDUSTRIES, LLC, Dover City, Kent County, DE (US)

( * ) Notice: Subject to any disclaimer, the term of this patent is extended or adjusted under 35 U.S.C. 154(b) by 0 days.

(21) Appl. No.: 16/088,946

(22) PCT Filed: Apr. 27, 2017

(86) PCT No.: PCT/TR2017/050166
§ 371 (c)(1),
(2) Date: Sep. 27, 2018

(87) PCT Pub. No.: WO2017/196279
PCT Pub. Date: Nov. 16, 2017

(65) Prior Publication Data
US 2019/0339815 A1    Nov. 7, 2019

(30) Foreign Application Priority Data

May 13, 2016 (TR) .............................. a 2016/06363

(51) Int. Cl.
*G06F 3/042*  (2006.01)
*G06F 3/041*  (2006.01)
(Continued)

(52) U.S. Cl.
CPC .......... *G06F 3/0425* (2013.01); *G06F 3/0414* (2013.01); *G06T 1/0014* (2013.01);
(Continued)

(58) Field of Classification Search
CPC .......... G01L 5/228; G01L 1/242; G01L 1/248
See application file for complete search history.

(56) References Cited

U.S. PATENT DOCUMENTS 4,547,668 A    10/1985  Tsikos
4,816,811 A *  3/1989  Bogatin ................. G06F 3/042
                                                      341/31
(Continued)

FOREIGN PATENT DOCUMENTS

WO    2014/011126 A1    1/2014

OTHER PUBLICATIONS

International Search Report, Written Opinion and International Preliminary Report on Patentability for corresponding PCT Application No. PCT/TR2017/050166, dated Apr. 20, 2018.
(Continued)

*Primary Examiner* — Jonathan M Dunlap
(74) *Attorney, Agent, or Firm* — Notaro, Michalos & Zaccaria P.C.

(57) ABSTRACT

A sensing system where the position and intensity of a force applied is detected with high resolution and an image and video of the surrounding environment is taken. A three-dimensional scanning thereof is performed, and the surface texture of the object touched and creep is detected. A two-dimensional and three-dimensional image (hologram) may be generated and physical and/or chemical features are detected.

51 Claims, 6 Drawing Sheets

(51) Int. Cl.
*G06T 1/00* (2006.01)
*G01L 1/24* (2006.01)
*G01L 5/22* (2006.01)

(52) U.S. Cl.
CPC .............. *G01L 1/242* (2013.01); *G01L 1/248* (2013.01); *G01L 5/228* (2013.01); *G06F 2203/04106* (2013.01); *G06F 2203/04808* (2013.01)

(56) References Cited

U.S. PATENT DOCUMENTS

| | | | |
|---|---|---|---|
| 5,127,078 A | 6/1992 | Terry et al. | |
| 6,504,530 B1* | 1/2003 | Wilson | G06F 3/0418 345/173 |
| 8,554,280 B2* | 10/2013 | Patel | G06Q 20/32 455/566 |
| 8,917,436 B2* | 12/2014 | Hollman | G02F 1/178 359/245 |
| 8,971,568 B1* | 3/2015 | Smits | G06F 3/03545 382/100 |
| 9,030,653 B1* | 5/2015 | Buyuksahin | G01L 5/228 356/32 |
| 9,170,419 B2* | 10/2015 | Charlson | G02B 26/004 |
| 9,897,496 B2* | 2/2018 | Hayashi | C08G 61/00 |
| 2002/0097320 A1 | 7/2002 | Zalis | |
| 2004/0252867 A1* | 12/2004 | Lan | G06K 9/0004 382/124 |
| 2006/0086896 A1* | 4/2006 | Han | G06F 3/0421 250/221 |
| 2006/0203240 A1* | 9/2006 | Ingleson | G01J 3/02 356/319 |
| 2006/0251365 A1* | 11/2006 | Brewer | G02B 6/08 385/116 |
| 2007/0212259 A1* | 9/2007 | Fujimura | G01N 21/05 356/244 |
| 2007/0227267 A1* | 10/2007 | Loeb | B25J 13/084 73/862.046 |
| 2008/0027582 A1* | 1/2008 | Obinata | B25J 13/082 700/260 |
| 2008/0291456 A1* | 11/2008 | Ghislain | G01N 29/022 356/450 |
| 2009/0315989 A1* | 12/2009 | Adelson | A61B 5/1172 348/135 |
| 2010/0073328 A1* | 3/2010 | Lynch | G06F 3/0412 345/175 |
| 2010/0155579 A1 | 6/2010 | Torres-Jara | |
| 2011/0032512 A1* | 2/2011 | Horowitz | G01N 13/02 356/35.5 |
| 2011/0164254 A1* | 7/2011 | Ghislain | G01N 29/022 356/477 |
| 2012/0069333 A1* | 3/2012 | Fujimura | G01N 21/05 356/326 |
| 2012/0229881 A1* | 9/2012 | Hollman | G02F 1/178 359/245 |
| 2012/0303839 A1 | 11/2012 | Jackson et al. | |
| 2013/0017948 A1* | 1/2013 | Charlson | G02B 26/004 503/201 |
| 2013/0021611 A1* | 1/2013 | Tsurutani | G01J 3/02 356/416 |
| 2013/0235369 A1* | 9/2013 | Koifman | G01M 11/31 356/73.1 |
| 2013/0265285 A1 | 10/2013 | Piccolotto et al. | |
| 2014/0055414 A1 | 2/2014 | Kim | |
| 2015/0103333 A1* | 4/2015 | Yun | G01N 21/8803 356/32 |
| 2015/0109607 A1* | 4/2015 | Buyuksahin | G01L 5/228 356/32 |
| 2015/0130734 A1* | 5/2015 | Chang | G06F 3/044 345/173 |
| 2015/0217781 A1* | 8/2015 | Lee | B60W 50/10 701/1 |

OTHER PUBLICATIONS

Hristu, Dimitris, et al., "The performance of a deformable-membrane tactile sensor: basic results on geometrically-defined tasks.", IEEE Int'l Conf. on Robotics and Automation, 2000, Piscataway, NJ, vol. 1, Apr. 24, 2000, pp. 508-513, XP010500265, ISBN: 078-0/7803-5886-7.

International Preliminary Report on Patentability for corresponding PCT application No. PCT/TR2017/050166, dated Apr. 20, 2018.

* cited by examiner

MULTI-FUNCTION SENSING SYSTEM

RELEVANT TECHNICAL FIELD

The present invention relates to sensing systems that are used especially in robotic systems.

BACKGROUND ART

In order to explore those areas which may be dangerous for human (for example, different planets, underground tunnels or caves), exploration robots are used. Exploration robots comprise various sensors for detecting objects in the area they are sent and for identifying the characteristics of the said objects. One of the sensors used in the said exploration robots is tactile sensors. By means of the tactile sensors, presence of certain objects, the force applied by them and some physical features thereof such as pressure and rigidity can be detected.

The conventional tactile sensors comprise a light source positioned under an elastic surface and a light sensing element for sensing the amount of the light reflected from the said surface, as disclosed in US2010155579A1. In such tactile sensors, when a force is applied on the elastic surface, the said surface approaches to the light source and the light sensing element. As a result of such approach, the amount of light incident on the light sensing element increases. The amount of light sensed by the light sensing element and resilience properties of the surface are used to calculate the amount of force applied to the surface. However, in this embodiment, the number of light sources that may be positioned under the unit surface and of the light sensing elements are limited, and it is cumbersome to process data received from a high number of light sensing elements.

Said problems are solved by a module disclosed in WO2014011126A1. The said module comprises an elastic material, which is covered with a layer providing light reflection; a CMOS or CCD image sensor; at least one light source; a plurality of first fiber optic cables, a tips of which are separated from surrounding environment via said layer by being located under the layer and other tips of which are in connection with said light source, wherein said first fiber optic cables carry light beams from the light source to said layer; a plurality of second fiber optic cables, a tips of which are separated from surrounding environment via said layer by being located under the layer and being directed towards the layer and other tips of which are in connection with said image sensor so that each second fiber optic cable is paired with one pixel of the image sensor, wherein light beams reflected from the layer are transferred to the image sensor by said second fiber optic cables; a processor which calculates every individual force applied to the layer according to light intensity changes of each pixel connected with a second fiber cable, of a photo frame generated by the image sensor in response to the displacement of the layer by using image processing techniques. In the module disclosed in WO2014011126A1, when the elastic material contacts to an object, a deformation is generated in the elastic material and the said layer (e.g. displacement of the layer towards the fiber optic cables). As a result of such displacement, the amount of light reflected from the layer to the fiber optic cable is changed. Said change in the amount of light is detected as a color change in the photo frame generated in the image sensor. The processor applies image processing techniques to the said photo frame so as to calculate color changes of the photo, and thus the amount of displacement of the layer. Based on the amount of displacement calculated, the force applied on the elastic material is also calculated. By means of the displacement area represented by the area of color change in the image, the pressure applied is calculated. Although the tactile sensation is detected with a high resolution by means of the module disclosed in WO2014011126A1, since the said module can only sense touch, it cannot provide other sensing functions required by an exploration robot.

Another patent document U.S. Pat. No. 5,127,078A discloses an integrated display for image presentation and receiving using fiber optics. Said document discloses three alternative devices for generating an image. The first one is a two-dimensional system in which is shown a fiber optic faceplate with about half of the fibers separated and extended from the faceplate. About one half being the light receiving fiber and about the other half being the light emitters for image presentation. The light receiver could be a video camera, photo diode or other form of light receiver. The light emitter could be a diode, CRT or other form of light emitter.

Another patent document US2002097230A1 discloses an optical graphic interface system. Said optical graphic interface system comprises, a large screen display and detection surface panel; a plurality of optical detection fibers in communication with the surface panel; a photosensor array in optical communication with the array of optical detection fibers; a plurality of optical display fibers in optical communication with the surface panel; and an image projector and input matrix, the input matrix optically connected to the optical display fibers, the image projector positioned to transmit an image through the input matrix and the optical display fibers to the surface panel.

Another patent document US2013265285A1 discloses different embodiments directed to a proximity sensor apparatus. Said proximity sensor apparatus comprises multiple optical fibers each having an open end, the multiple optical fibers operative to conduct light and arranged such that the open ends for the multiple optical fibers form a grid; multiple light sources communicatively coupled with corresponding optical fibers, the multiple light sources operative to emit light through an open end of corresponding optical fibers; and multiple photoelectric sensors communicatively coupled with corresponding optical fibers, the multiple photoelectric sensors operative to detect emitted light that has been reflected back off an object into the open end of one or more of the multiple optical fibers.

BRIEF DESCRIPTION OF THE INVENTION

With the present invention, there is provided a sensing system suitable for use especially in robotic systems. Said sensing system comprises at least an elastic layer; at least one image source positioned under the said elastic layer and generating at least one image; at least one image sensor positioned under the elastic layer; at least a first fiber optic bundle comprising a plurality of fiber optic cables, a tips of which is paired with at least one pixel of the image source and other tips of which is positioned facing to the said elastic layer, and transmitting the image generated in the image source to the elastic layer; at least a second fiber optic bundle comprising a plurality of fiber optic cables, a tips of which is paired with at least one pixel of the image sensor and other tips of which is positioned facing to the said elastic layer, and transmitting the image received from the elastic layer or from the surrounding environment to the image sensor; at least one control unit which controls the image generated by the said image source and analyzes the image captured by the image sensor using image processing techniques so as to detect at least one data about the surrounding environment; at least a first data link for data communication between the image source and the control unit; and at least a second data link for data communication between the image sensor and the control unit.

In the sensing system according to the present invention, since a tip of each fiber optic cable in the first fiber optic bundle (or in the combined fiber optic bundle) is paired with at least one pixel of an image source, the light transmitted to the elastic layer by means of each fiber optic cable may be individually controlled. Thus, tactile sensation is provided by detecting a force applied on the elastic layer in an easy and practical manner, and also the surrounding environment can be scanned.

OBJECT OF THE INVENTION

An object of the present invention is to provide a sensing system suitable for use in robotic systems.

Another object of the present invention is to provide a sensing system capable of sensing touch.

Another object of the present invention is to provide a sensing system capable of performing two-dimensional scanning (capturing a photo and video of an image) and three-dimensional scanning.

Another object of the present invention is to provide a sensing system capable of sensing the surface texture of an object that is touched and the creep.

Another object of the present invention is to provide a sensing system capable of generating a two-dimensional and three-dimensional (hologram) image.

Yet another object of the present invention is to provide a sensing system which is easy-to-manufacture.

Still another object of the present invention is to provide a sensing system capable of sensing physical and/or chemical features.

DESCRIPTION OF THE DRAWINGS

Illustrative embodiments of the sensing system according to the present invention are illustrated in the enclosed drawings, in which.

Figure 1A:
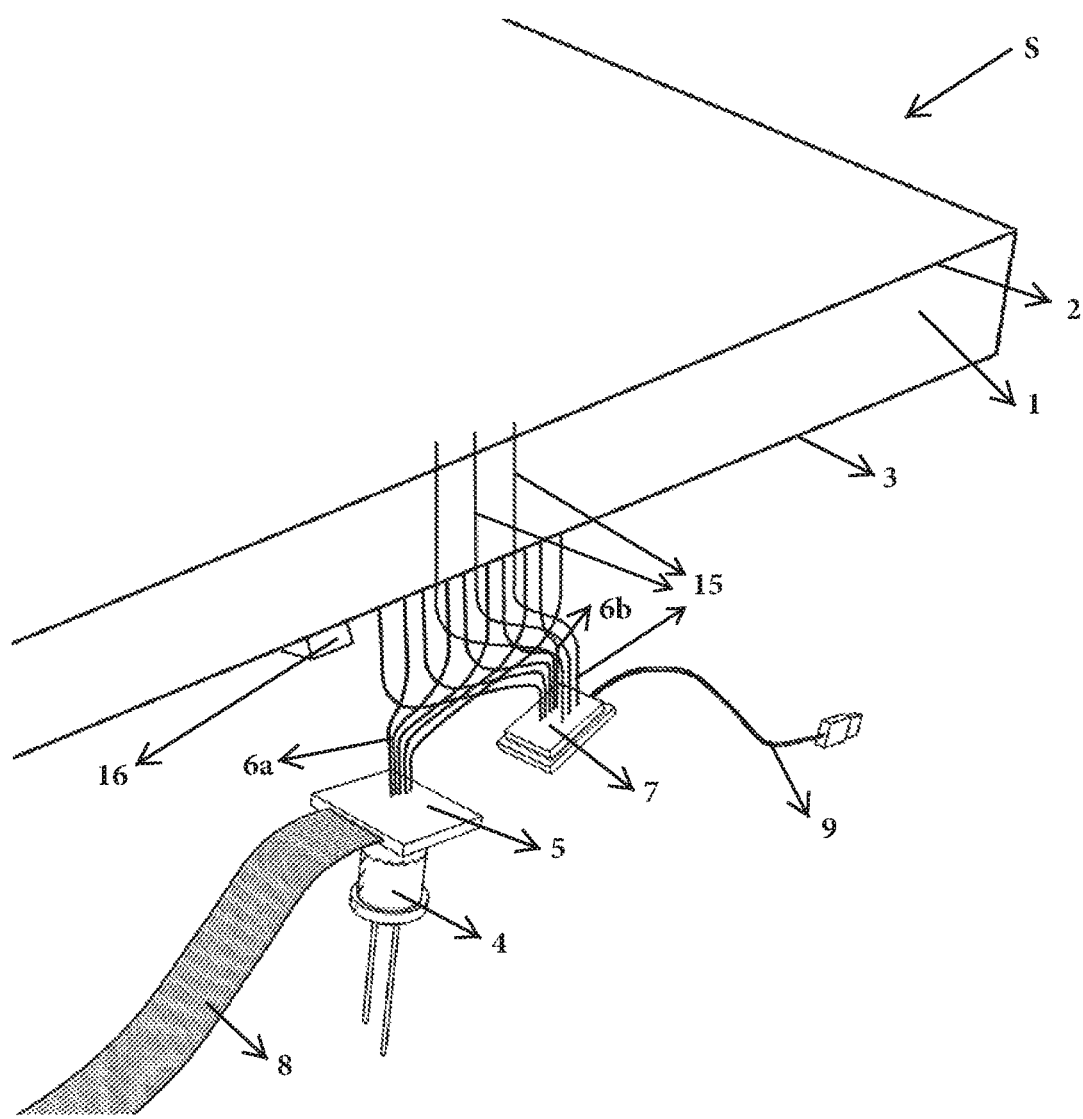
FIG. 1A is a perspective view of a sensing system illustrating parts of the sensing system.
Figure 1B:
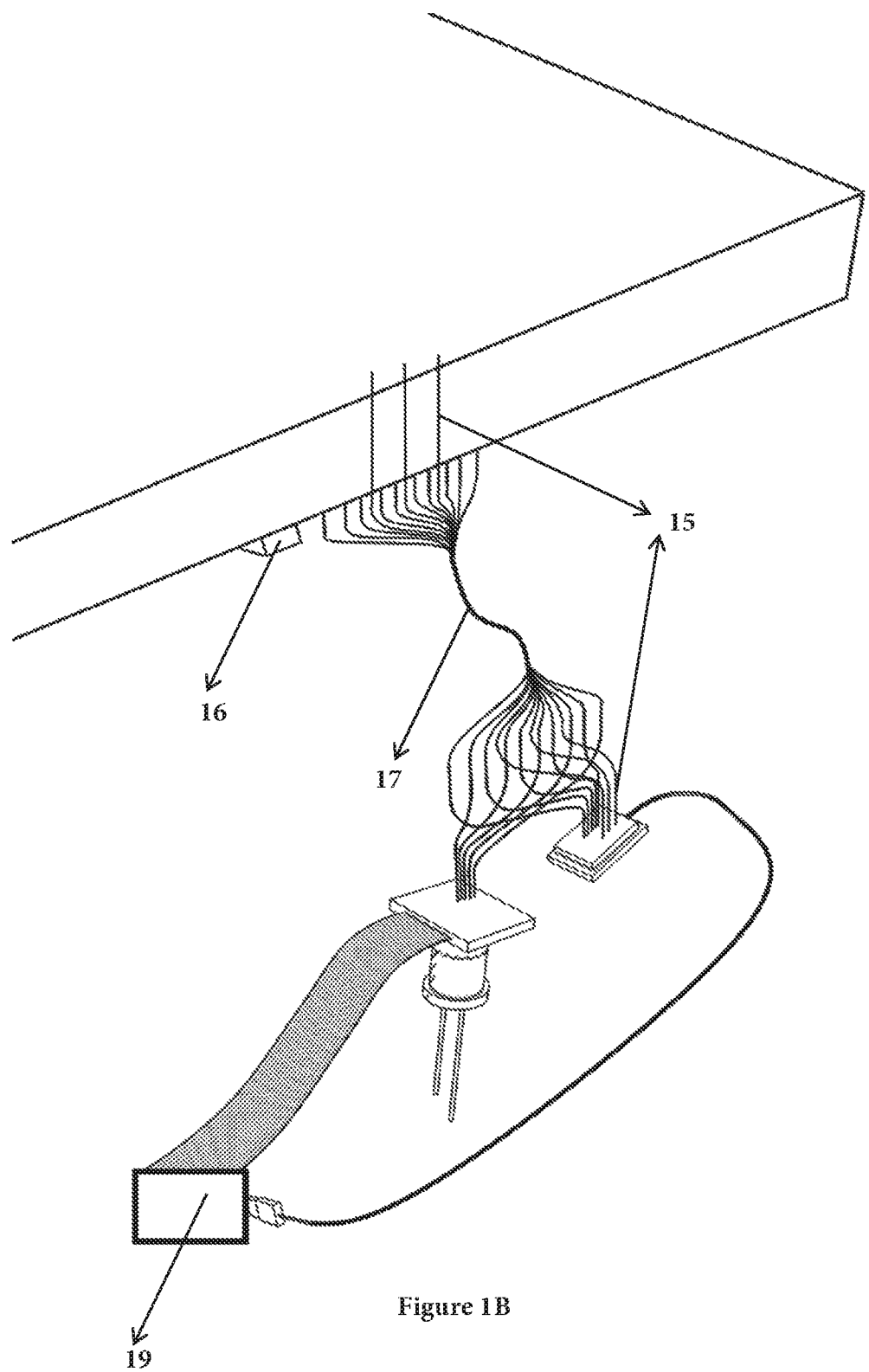
FIG. 1B is a perspective view of the sensing system of FIG. 1A, and illustrating additional parts of the sensing system.

All the parts illustrated in the drawings are individually assigned a reference numeral and the corresponding terms of these numbers are listed as follows:

Sensing system (S)
Robotic hand (R)
Image (P)
Elastic layer (1)
Upper surface (2)
Lower surface (3)
Light source (4)
Image source (5)
First fiber optic bundle (6a)
Second fiber optic bundle (6b)
Combined fiber optic bundle (6c)
Image sensor (7)
First data link (8)
Second data link (9)
Floor (10)
Object (11)
Lighting element (12)
Filter (13)
Color sensor (14)
Third fiber optic cable (15)
Sound sensor (16)
Carrier fiber optic cable (17)
Robot having sound capable of generating vapor or other medium (18)
Control unit (19)

DESCRIPTION OF THE INVENTION

With the advanced robot technology, senses such as seeing, hearing, touching can be detected by sensor systems. Particularly, in exploration robots used to explore those areas that are dangerous for humans or not possible for humankind to arrive, the characteristics of the areas that are being explored can be detected accurately by means of the said sensor systems. Therefore, with the present invention, a sensing system is provided which is capable of performing different sensing operations.

The sensing system (S) according to the present invention, as illustrated in FIGS. 1-6, comprises at least an elastic layer (1); at least one image source (5) positioned under the said elastic layer (1) and generating at least one image (P); at least one image sensor (7) (i.e. a CCD, CMOS sensor etc.) positioned under the elastic layer (1); at least a first fiber optic bundle (6a) comprising a plurality of fiber optic cables, a tips of which is paired with at least one pixel of the image source (5) and other tips of which is positioned facing to the said elastic layer (1), and transmitting the image (P) generated in the image source (5) to the elastic layer (1); at least a second fiber optic bundle (6b) comprising a plurality of fiber optic cables, a tips of which is paired with at least one pixel of the image sensor (7) and other tips of which is positioned facing to the said elastic layer (1), and transmitting the image received from the elastic layer (1) or from the surrounding environment to the image sensor (7); at least one control unit (19) which controls the image (P) generated by the said image source (5) and analyzes the image captured by the image sensor (7) using image processing techniques so as to detect at least one data about the surrounding environment. The sensing system (S) also comprises at least a first data link (8) for data communication between the image source (5) and the control unit (19); and at least a second data link (9) for data communication between the image sensor (7) and the control unit (19). The first data link (8) and the second data link (9) may be a wired connection or a wireless connection. The said elastic layer (1) comprises at least one upper surface (2) facing to the surrounding environment; and at least one lower surface (3) to which the first fiber optic bundle (6a) and the second fiber optic bundle (6b) are connected.

In an illustrative embodiment of the invention, the said upper surface (2) is light-proof (opaque or bright) and preferably not absorbing light. In this embodiment, the image (P) having a certain pattern by means of the said image source (5) is transferred to the elastic layer (1) via the first fiber optic bundle (6a) in order to generate a pattern (for example, a squared chess board pattern) on the upper surface (2). The pattern generated on the upper surface (2) is transferred to the image sensor (7) via the second fiber optic pattern (6b) and an image frame is generated by the image sensor (7). Here, when a force is applied on the said elastic layer (1) (for example, when an object is placed on the elastic layer (1)), the elastic layer (1) on the respective region yields such that the upper layer (2) approaches to the lower layer (3). As a result of such displacement of the upper layer (1), the pattern generated on the upper layer (2) is deformed. Since the pattern generated on the upper layer (2) is transferred to the image sensor (7), an image frame including the deformed pattern is generated in the image sensor (7). The way in which the pattern of the obtained image frame is deformed is analyzed by the control unit (19) using image processing techniques in order to determine which part of the upper layer (2) approaches to the lower layer (3) and to what the extent. The force and pressure applied to the elastic layer (1) is calculated based on the extent of the approach determined, the area of the yielding region and the modulus of elasticity of the elastic layer (1).

In another illustrative embodiment of the invention, the said upper layer (2) is transparent (light transmitting). In this embodiment, the image (P) having a certain pattern by means of the image source (5) is transferred from the elastic layer (1) to the surrounding environment via the first fiber optic bundle (6a). When the image (P) transferred to the surrounding environment is incident on a floor (10) and/or an object (11), an image of the floor (10) and/or the object (11) is captured by the image sensor (7) so as to obtain an image frame. Here, the image obtained by the image source (5) may have a fixed pattern (for example, a chess board pattern), or a varying pattern may also be used. For instance, by changing the places of the black and white squares of a chess board pattern, different image frames from different patterns may be obtained in the image sensor (7). By analyzing the obtained image frame or image frames in the control unit (19) using image processing techniques, the visual data of the floor (10) and/or object (11) (such as the surface pattern of the object (11), overall shape etc.) may be obtained. Furthermore, a creep movement on the elastic layer (1) may be detected.

In the embodiments wherein the upper surface (2) is transparent, when an object is placed on the elastic layer (1) so as to apply force thereon, the image transmitted on the said object via the first fiber optic bundle (6a) is captured by the image sensor (7) and the image frame captured is analyzed in the control unit (19) using image processing techniques so that it is determined how much the object is close to the lower surface (3). Since the distance of the object from the lower surface (3) also gives the distance of the upper surface (2) from the lower surface (3), it is determined which part of the upper layer (2) approaches to the lower layer (3) and to what extent. The force and pressure applied to the elastic layer (1) is calculated based on the extent of the approach of the upper layer (2) to the lower layer (3), the area of the yielding region and the modulus of elasticity of the elastic layer (1).

In an alternative embodiment wherein the upper layer (2) is transparent, the brightness of the image (P) generated in the image source (5) is set at a level (a limit level) that the elastic layer (1) is illuminated but no image (P) or light is transmitted to the surrounding environment. In this embodiment, when an object contacts on the elastic layer (1), those regions of the said object contacting to the elastic layer (1) are also illuminated. Thus, the image of the said object may be captured by the image sensor (7), even without a force applied by the said object on the elastic layer (1). In this embodiment, a creep movement on the elastic layer (1) may be detected. By increasing the intensity of the light from the limit level to a certain extent, the object may be sensed before it approaches to the system, and by reducing the intensity of the light from the limit level to a certain extent, it will be sensed after a little penetration has occurred, and thus it will be sensed with a certain threshold value.

Figure 2:
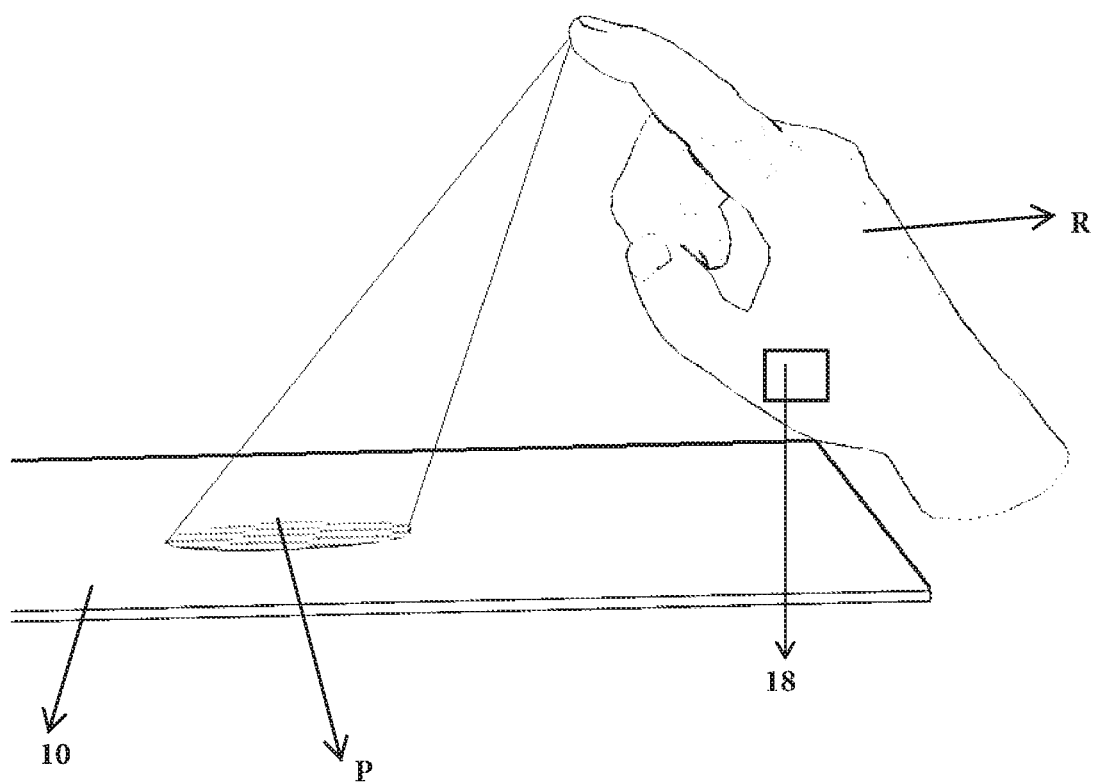
FIG. 2 is a perspective view of an exemplary embodiment of the sensing system.
Figure 3:
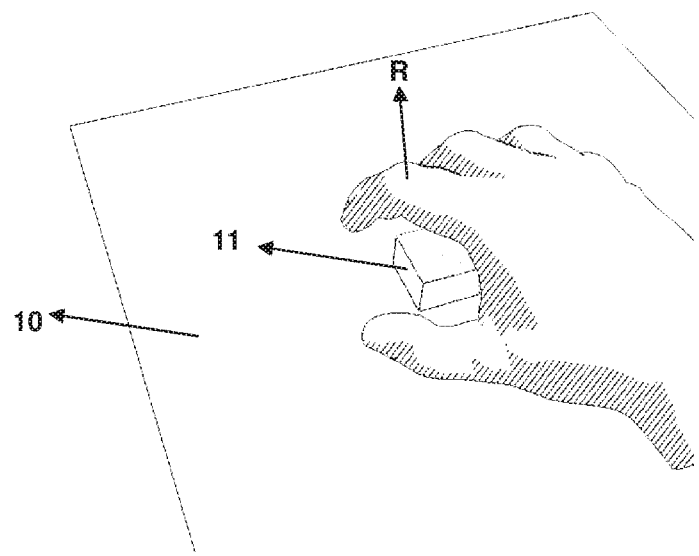
FIG. 3 is a perspective view of another exemplary embodiment of the sensing system.
Figure 4:
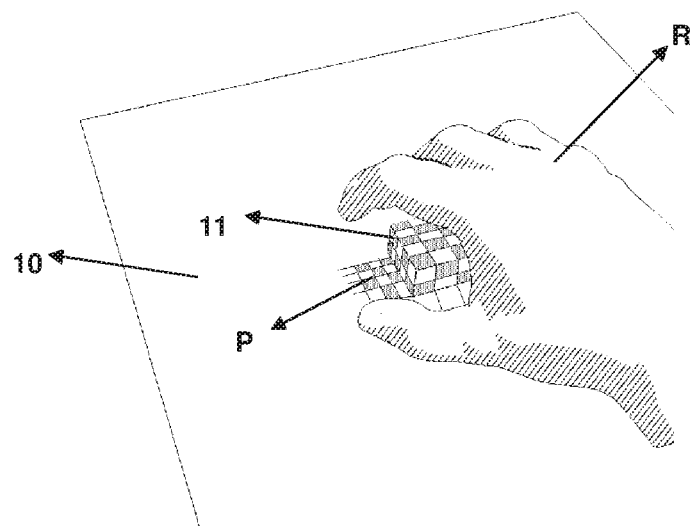
FIG. 4 is a perspective view of a further exemplary embodiment of the sensing system.

In another illustrative embodiment of the invention shown in FIGS. 2-4, the sensing system (S) according to the present invention is used in a robotic hand (R). In this embodiment, in the robotic hand (R), the elastic layer (1) mimics (simulates) the human flesh. In different areas of the robotic hand (R) (especially fingers), the first fiber optic bundle (6a) and the second fiber optic bundle (6b) are positioned. In an embodiment wherein the upper surface (2) of the elastic layer (1) is transparent, an image (P) with a desired pattern may be transferred from the desired positions of the robotic hand (R) to the surrounding environment. Thus, a floor (10) is scanned in order to obtain a two-dimensional image thereof, as shown in FIG. 2, or an object (11) is scanned in order to obtain a three-dimensional image thereof as well as point cloud data and measures thereof with high precision which are suitable for being generated and/or copied by three-dimensional production tools such as a 3D printer, as shown in FIGS. 3-4. In an alternative embodiment, an image of the surrounding environment can be directly recorded without transferring a pattern or image (P) to the surrounding environment. In other words, the robotic hand (R) may be used as a camera. Furthermore, in this embodiment, the robotic hand (R) may preferably be used as a two-dimensional projector by transferring an image (P) on a flat floor (10). Alternatively, the robotic hand (R) may be used as a three-dimensional projector by transferring images (P) from different positions of the robotic hand (R) to a medium containing particles (for example, a medium containing water vapor). In this embodiment, the robotic hand (R) may comprise at least a robot (18) capable of generating vapor or another dense medium, in order to generate a medium such as water vapor.

In alternative embodiments of the invention, the sensing system (S) may be placed in a glove with similar features, instead of the robotic hand (R). Thus, if the glove is worn by a user, any applications performed by the robotic hand (R) may also be performed by the glove.

In a preferred embodiment of the invention, the said image source (5) is in the form of an LCD panel. In this embodiment, the sensing system (S) also comprises at least one light source (4) located at the side of the image source (5) not connected to the first fiber optic bundle (6a). In this embodiment, color and brightness values of each pixel in the LCD panel may be controlled independent from each other. Thus, the color and brightness of the light transmitted from each fiber optic cable in the first fiber optic bundle (6a) to the elastic layer (1) may be individually controlled. In an alternative embodiment, the image source (5) is in the form of a panel, each pixel of which including a RGB LED. In this embodiment, color and brightness values of each pixel may be controlled independent from each other.

The light emitted by the light source (4) may have varying wavelengths (visible light, infrared light etc.), or may be at different blink frequencies (for example, constant blinking, fixed-frequency blinking, blinking at a frequency varied in a predetermined order). Thus, the light transmitted by the system for sensing may be distinguished from the images that may come from the surrounding environment and other lights, and it may be prevented that those lights other than the ones transmitted by the system cause an erroneous detection. In the said embodiments, the image sensor (7) is selected such that it senses the wavelength (i.e. infrared) of the light source (4) used and the frequency thereof (for example, a high frequency camera sensor).

Figure 5:
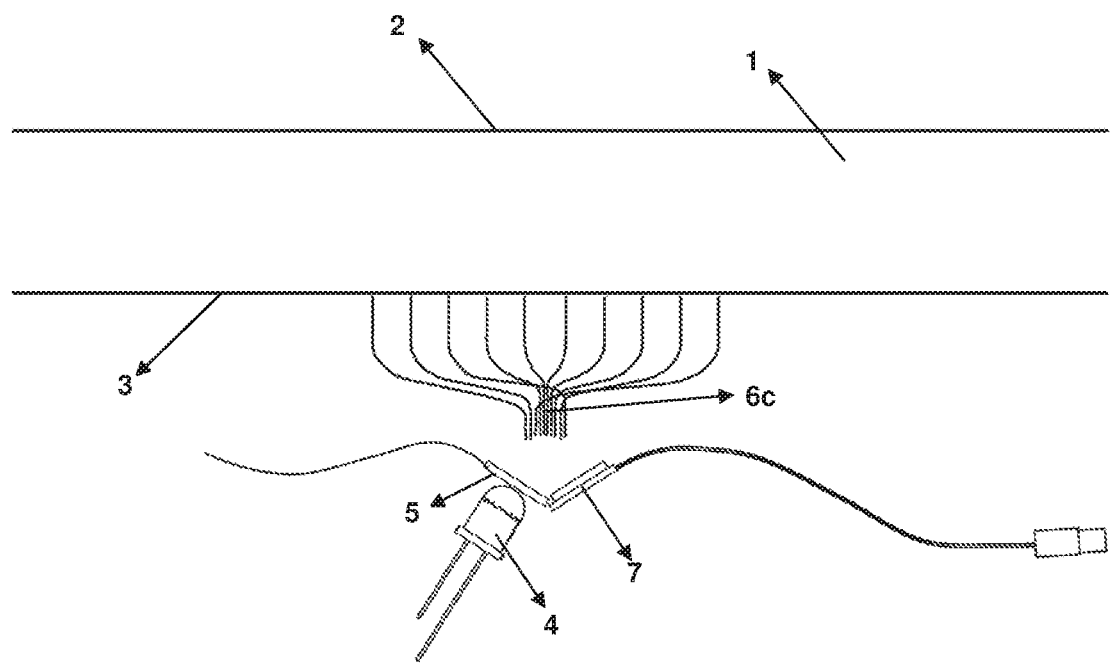
FIG. 5 is a perspective view of an alternative embodiment of the sensing system.
Figure 6:
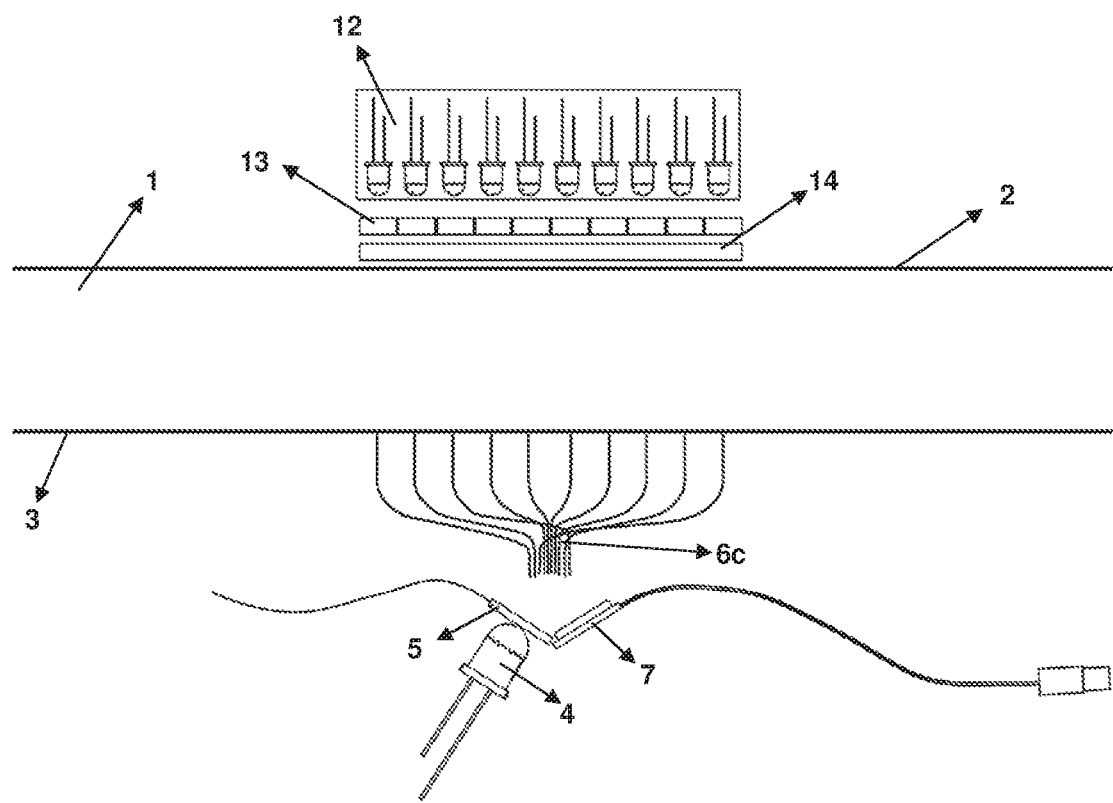
FIG. 6 is a perspective view of a pairing status in the alternative embodiment of the sensing system.

In another preferred embodiment of the invention shown in FIGS. 5-6, the sensing system (S) comprises at least one combined fiber optic bundle (6c). The said combined fiber optic bundle (6c) comprises a plurality of fiber optic cables, a tips of which is paired with at least one pixel of the image source (5) as well as one pixel of the image sensor (7) and other tips of which is positioned facing to the said elastic layer (1). In other words, in this embodiment, the function of the first fiber optic bundle (6a) and the second fiber optic bundle (6b) is performed by the combined fiber optic bundle (6c). In this embodiment, the image source (5) and the image sensor (7) are positioned such that they face to each other at a certain angle (for example, 90°). A tip of the combined fiber optic bundle (6c) is positioned between the image source (5) and the image sensor (7). Thus, a tip of each fiber optic cable in the combined fiber optic bundle (6c) is paired with at least one pixel of the image source (5) as well as one pixel of the image sensor (7). In other words, each fiber optic cable in the combined fiber optic bundle (6c) may transmit image (a light beam) both from the image source (5) to the elastic layer (1) and from the elastic layer (1) and/or surrounding environment to the image sensor (7).

In the embodiment wherein the sensing system (S) comprises a combined fiber optic bundle (6c), it must be known which fiber optic cable is paired with which pixel of the image source (5) and which pixel of the image sensor (7). In order to produce the sensing system (S) in an easy and practical manner, a pairing unit is used in the present invention. Said pairing unit is configured to transmit a light of different color to each fiber optic cable of the combined fiber optic bundle (6c) facing to the elastic layer (1). In order to fulfill this function, the pairing unit comprises at least one lighting element (12) and at least one filter (13) which filters the light generated by the lighting element (12) in different colors so as to transmit a different colored light to each fiber optic cable. Alternatively, the pairing unit may comprise an image source like an LCD panel. In this embodiment, since a light of different color is transmitted to each pixel of the image sensor (7) by means of each fiber optic cable, it is determined which fiber optic cable is paired with which pixel of the image sensor (7). The pairing information is preferably recorded in the control unit (19) as a first data matrix (primary addressing matrix). Then, the lights generated by generating different colored lights from each pixel of the image source (5) are reflected out through the combined fiber optic bundle (6c) and the elastic layer (1). After the lights are detected by a color sensor (14) (i.e. a camera) positioned facing to system externally, it is identified which fiber optic cable is paired with which pixel of the image source (5). Here, the image sensor (7) may also be used as the color sensor (14) (in order to use the image sensor (7), pixel pairing is initially performed between the image sensor (7) and the combined fiber optic bundle (6c)). The pairing information is preferably recorded in the control unit (19) as a second data matrix (secondary addressing matrix). Thus, the sensing system (S) may be produced in an easy and practical manner without arranging the fiber optic cables one by one and in separate groups.

In another preferred embodiment of the invention, the sensing system (S) comprises at least one lens unit (not shown in the figures) located at that side of the first fiber optic bundle (6a), the second fiber optic bundle (6b) and/or the combined fiber optic bundle (6c) facing to the elastic layer (1). The said lens unit ensures transmitting, to the elastic layer (1), of the lights transmitted from the image source (5) to the elastic layer (1) via the first fiber optic bundle (6a) or the combined fiber optic bundle (6c), at the desired angle and/or dimension. Thus, the image obtained in the image source (5) is transmitted to the elastic layer (1) without being deformed. Likewise, the lens unit ensures that the lights transmitted from the elastic layer (1) to the second fiber optic bundle (6b) or the combined fiber optic bundle (6c) are inputted at the desired angle and/or dimension. Thus, a clear image is obtained in the image sensor (7). Furthermore, it is thus possible to arrange the fiber optic cables at a lower interval without any loss in the detection.

In another preferred embodiment of the invention, the image sensor (7) of the sensing system (S) comprises special sensors for detecting certain physical and/or chemical features. For example, since the said image sensor (7) comprises a thermal camera sensor, the temperature of an object or of the surrounding environment may be detected.

In an alternative embodiment of the invention, the sensing system (S) comprises at least a third fiber optic cable or cable bundle (17), a tips of which is paired with at least one pixel of the image sensor (7) and other tips of which comprises at least one carrier fiber optic cable or cable bundle (17) extending from the said elastic layer (1) to surrounding environment, which cable or cable bundle transmitting the image received from the surrounding environment to the image sensor (7). In this embodiment, the images obtained from the surrounding environment by means of the said third fiber optic cable or cable bundle (17) may be directly transmitted to the image sensor (7). Thus, in embodiments wherein the elastic layer (1) is not transparent, the image of the surrounding environment may be obtained. Furthermore, this would be beneficial in industrial cutting and burning as well as incision and sealing by burning with surgery robots, by selecting the said third fiber optic cable or cable bundle (17) in a proper manner and transferring to the surrounding environment a suitable laser light for cutting and/or burning that is generated by means of a high-powered alternative light source.

In another alternative embodiment of the invention, at least one fiber optic bundle (the first fiber optic bundle (6a) and/or the second fiber optic bundle (6b) and/or the third fiber optic bundle and/or the combined fiber optic bundle (6c)) is a multi-piece bundle. In this embodiment, the fiber optic bundle comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section. In this way, in the embodiments wherein the length of the fiber optic cables must be long, it will be sufficient that one or a limited number of fiber optic cables (carrier fiber) is long, instead of a high number of fiber optic cables. In another embodiment of the carrier fiber, the diameter of the said carrier fiber optic cable is lower than that of the first section and the second section. In this embodiment, in order to have an exact pairing of each fiber optic cable in the first section with each fiber optic cable in the second section (i.e. to ensure that the light beams coming from different fiber optic cables do not intervene with each other), the fiber optic bundle also comprises at least two optic elements, each interposed between the carrier fiber optic cable and the first section, and between the carrier fiber optic cable and the second section. The said optic elements prevent the light beams flowing through the carrier fiber optic cable from intervening with each other.

In another preferred embodiment of the invention, the sensing system (S) comprises at least one sound sensor (16) (for example, a microphone). The said sound sensor (16) is preferably located on the lower surface (3) of the elastic layer (1). Thus, creep-induced sound waves are also detected by the sound sensor (16) and a more precise detection is performed. In alternative embodiments, a plurality of sound sensors (16) are used and the sound waves detected by the sound sensors (16) are compared so that coordinates of touch may be detected precisely.

In the sensing system (S) according to the present invention, since a tip of each fiber optic cable in the first fiber optic bundle (6a) (or in the combined fiber optic bundle (6c)) is paired with at least one pixel of an image source (5), the light transmitted to the elastic layer (1) by means of each fiber optic cable may be individually controlled. Thus, tactile sensation is provided by detecting a force applied on the elastic layer (1) in an easy and practical manner, and also the outer environment can be scanned.

The invention claimed is:

1. A sensing system (S) comprising:
   at least one elastic layer (1) formed as a separate part;
   at least one image source (5) positioned under the said elastic layer (1) and generating at least one image (P);
   at least one image sensor (7) positioned under the elastic layer (1);
   at least a first fiber optic bundle (6a), which comprises a plurality of fiber optic cables, a tips of which is paired with at least one pixel of the image source (5) and other tips of which is positioned facing to the said elastic layer (1), and which transmits the image (P) generated in the image source (5) to the elastic layer (1);
   at least a second fiber optic bundle (6b), which comprises a plurality of fiber optic cables, a tips of which is paired with at least one pixel of the image sensor (7) and other tips of which is positioned facing to the said elastic layer (1), and which transmits the image received from the elastic layer (1) or from the surrounding environment to the image sensor (7);
   at least one control unit which controls the image (P) generated by the said image source (5) and analyzes the image captured by the image sensor (7) using image processing techniques so as to detect at least one data about the surrounding environment;
   at least a first data link (8) for data communication between the image source (5) and the control unit; and
   at least a second data link (9) for data communication between the image sensor (7) and the control unit
   wherein said elastic layer (1) comprises at least one upper surface (2) facing to the surrounding environment; and at least one lower surface (3) to which the first fiber optic bundle (6a) and the second fiber optic bundle (6b) are connected, characterized in that the said upper surface (2) is light-proof.

2. A sensing system (S) according to claim 1, characterized in that the said upper surface (2) is not absorbing light.

3. A sensing system (S) according to claim 1, characterized in that the said image source (5) is in the form of an LCD panel.

4. A sensing system (S) according to claim 3, characterized by comprising at least one light source (4) located at the side of the image source (5) which is not connected to the first fiber optic bundle (6a).

5. A sensing system (S) according to claim 4, characterized in that the said light source (4) is configured to emit light of varying wavelengths.

6. A sensing system (S) according to claim 4, characterized in that the said light source (4) is configured to emit light blinking at different frequencies.

7. A sensing system (S) according to claim 1, characterized in that the said image source (5) is in the form of a panel, each pixel of which including a RGB LED.

8. A sensing system (S) according to claim 1, characterized by comprising at least a combined fiber optic bundle (6c) serving as the first fiber optic bundle (6a) and the second fiber optic bundle (6b), and comprising a plurality of fiber optic cables, a tips of which is paired with at least one pixel of the image source (5) as well as one pixel of the image sensor (7) and other tips of which is positioned facing to the said elastic layer (1).

9. A sensing system (S) according to claim 8, characterized in that the image source (5) and the image sensor (7) are positioned such that they face to each other at a certain angle.

10. A sensing system (S) according to claim 8, characterized by comprising at least one lens unit located at that side of the combined fiber optic bundle (6c) facing to the elastic layer (1).

11. A sensing system (S) according to claim 8, characterized in that the combined fiber optic bundle (6c) comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

12. A sensing system (S) according to claim 11, characterized in that the combined fiber optic bundle (6c) comprises at least two optic elements, each interposed between the carrier fiber optic cable and the first section, and between the carrier fiber optic cable and the second section.

13. A pairing unit for determining which pixel of the image source (5) and which pixel of the image sensor (7) each fiber optic cable of the fiber optic bundle (6c) in a sensing system (S) according to claim 8 is paired with, characterized in that it is configured to transmit a light of different color to each fiber optic cable of the combined fiber optic bundle (6c) facing to the elastic layer (1).

14. A pairing unit according to claim 13, characterized by comprising at least one lighting element (12) and at least one filter (13) which filters the light generated by the lighting element (12) in different colors so as to transmit a different colored light to each fiber optic cable.

15. A pairing unit according to claim 13, characterized by comprising an image source.

16. A pairing unit according to claim 13, characterized by comprising at least one color sensor (14).

17. A sensing system (S) according to claim 1, characterized by comprising at least one lens unit located at that side of the first fiber optic bundle (6a) and/or the second fiber optic bundle (6b) facing to the elastic layer (1).

18. A sensing system (S) according to claim 1, characterized in that the said image sensor (7) comprises a thermal camera sensor.

19. A sensing system (S) according to claim 1, characterized by comprising at least a third fiber optic cable or cable bundle, a tips of which is paired with at least one pixel of the image sensor (7) and other tips of which comprises at least one fiber optic cable extending from the said elastic layer (1) to surrounding environment, which cable or cable bundle transmitting the image received from the surrounding environment to the image sensor (7).

20. A sensing system (S) according to claim 19, characterized in that the third fiber optic bundle comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

21. A sensing system (S) according to claim 20, characterized in that the third fiber optic bundle comprises at least two optic elements, each interposed between the carrier fiber optic cable and the first section, and between the carrier fiber optic cable and the second section.

22. A sensing system (S) according to claim 1, characterized by comprising at least one sound sensor.

23. A sensing system (S) according to claim 1, characterized in that the first fiber optic bundle (6a) and/or the second fiber optic bundle (6b) comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

24. A sensing system (S) according to claim 23, characterized in that the first fiber optic bundle (6a) and/or the second fiber optic bundle (6b) comprises at least two optic elements, each interposed between the carrier fiber optic cable and the first section, and between the carrier fiber optic cable and the second section.

25. A robotic hand (R) comprising a sensing system (S) according to claim 1.

26. A robotic hand (R) according to claim 25, characterized by comprising at least a source capable of generating vapor or another dense medium.

27. A sensing system (S) comprising:
at least one elastic layer (1);
at least one image source (5) positioned under the said elastic layer (1) and generating at least one image (P);
at least one image sensor (7) positioned under the elastic layer (1);
at least a first fiber optic bundle (6a), which comprises a plurality of fiber optic cables, a tips of which is paired with at least one pixel of the image source (5) and other tips of which is positioned facing to the said elastic layer (1), and which transmits the image (P) generated in the image source (5) to the elastic layer (1);
at least a second fiber optic bundle (6b), which comprises a plurality of fiber optic cables, a tips of which is paired with at least one pixel of the image sensor (7) and other tips of which is positioned facing to the said elastic layer (1), and which transmits the image received from the elastic layer (1) or from the surrounding environment to the image sensor (7);
at least one control unit which controls the image (P) generated by the said image source (5) and analyzes the image captured by the image sensor (7) using image processing techniques so as to detect at least one data about the surrounding environment;
at least a first data link (8) for data communication between the image source (5) and the control unit; and
at least a second data link (9) for data communication between the image sensor (7) and the control unit
wherein said elastic layer (1) comprises at least one upper surface (2) facing to the surrounding environment; and at least one lower surface (3) to which the first fiber optic bundle (6a) and the second fiber optic bundle (6b) are connected, characterized in that the said upper surface (2) is transparent, wherein said control unit determines how much an object, placed on the elastic layer (1), is close to the lower surface (3) and the force and pressure applied to the elastic layer (1) is calculated based on the extent of the approach of the upper layer (2) to the lower layer (3), the area of the yielding region and the modulus of elasticity of the elastic layer (1).

28. A sensing system (S) according to claim 27, characterized in that the said image source (5) is in the form of an LCD panel.

29. A sensing system (S) according to claim 28, characterized by comprising at least one light source (4) located at the side of the image source (5) which is not connected to the first fiber optic bundle (6a).

30. A sensing system (S) according to claim 29, characterized in that the said light source (4) is configured to emit light of varying wavelengths.

31. A sensing system (S) according to claim 29, characterized in that the said light source (4) is configured to emit light blinking at different frequencies.

32. A sensing system (S) according to claim 27, characterized in that the said image source (5) is in the form of a panel, each pixel of which including a RGB LED.

33. A sensing system (S) according to claim 27, characterized by comprising at least a combined fiber optic bundle (6c) serving as the first fiber optic bundle (6a) and the second fiber optic bundle (6b), and comprising a plurality of fiber optic cables, a tips of which is paired with at least one pixel of the image source (5) as well as one pixel of the image sensor (7) and other tips of which is positioned facing to the said elastic layer (1).

34. A sensing system (S) according to claim 33, characterized in that the image source (5) and the image sensor (7) are positioned such that they face to each other at a certain angle.

35. A sensing system (S) according to claim 33, characterized by comprising at least one lens unit located at that side of the combined fiber optic bundle (6c) facing to the elastic layer (1).

36. A sensing system (S) according to claim 33, characterized in that the combined fiber optic bundle (6c) comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

37. A sensing system (S) according to claim 36, characterized in that the combined fiber optic bundle (6c) comprises at least two optic elements, each interposed between the carrier fiber optic cable and the first section, and between the carrier fiber optic cable and the second section.

38. A pairing unit for determining which pixel of the image source (5) and which pixel of the image sensor (7) each fiber optic cable of the fiber optic bundle (6c) in a sensing system (S) according to claim 33 is paired with, characterized in that it is configured to transmit a light of different color to each fiber optic cable of the combined fiber optic bundle (6c) facing to the elastic layer (1).

39. A pairing unit according to claim 38, characterized by comprising at least one lighting element (12) and at least one filter (13) which filters the light generated by the lighting element (12) in different colors so as to transmit a different colored light to each fiber optic cable.

40. A pairing unit according to claim 38, characterized by comprising an image source.

41. A pairing unit according to claim 38, characterized by comprising at least one color sensor (14).

42. A sensing system (S) according to claim 27, characterized by comprising at least one lens unit located at that side of the first fiber optic bundle (6a) and/or the second fiber optic bundle (6b) facing to the elastic layer (1).

43. A sensing system (S) according to claim 27, characterized in that the said image sensor (7) comprises a thermal camera sensor.

44. A sensing system (S) according to claim 27, characterized by comprising at least a third fiber optic cable or cable bundle, a tips of which is paired with at least one pixel of the image sensor (7) and other tips of which comprises at least one fiber optic cable extending from the said elastic layer (1) to surrounding environment, which cable or cable bundle transmitting the image received from the surrounding environment to the image sensor (7).

45. A sensing system (S) according to claim 44, characterized in that the third fiber optic bundle comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

46. A sensing system (S) according to claim 45, characterized in that the third fiber optic bundle comprises at least two optic elements, each interposed between the carrier fiber optic cable and the first section, and between the carrier fiber optic cable and the second section.

47. A sensing system (S) according to claim 27, characterized by comprising at least one sound sensor.

48. A sensing system (S) according to claim 27, characterized in that the first fiber optic bundle (6a) and/or the second fiber optic bundle (6b) comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

49. A sensing system (S) according to claim 48, characterized in that the first fiber optic bundle (6a) and/or the second fiber optic bundle (6b) comprises at least two optic elements, each interposed between the carrier fiber optic cable and the first section, and between the carrier fiber optic cable and the second section.

50. A robotic hand (R) comprising a sensing system (S) according to claim 27.

51. A robotic hand (R) according to claim 50, characterized by comprising at least a source capable of generating vapor or another dense medium.

* * * * *